(12) United States Patent
Wu et al.

(10) Patent No.: US 9,121,338 B1
(45) Date of Patent: Sep. 1, 2015

(54) TWO-STAGE TURBOCHARGER SYSTEM FOR INTERNAL COMBUSTION ENGINES FEATURING CYLINDER DEACTIVATION

(71) Applicant: GM Global Technology Operations LLC, Detroit, MI (US)

(72) Inventors: Ko-Jen Wu, Troy, MI (US); Alan W. Hayman, Romeo, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/192,469

(22) Filed: Feb. 27, 2014

(51) Int. Cl.
*F02B 33/44* (2006.01)
*F02D 23/00* (2006.01)
*F02B 33/00* (2006.01)
*F02D 13/06* (2006.01)
*F02B 37/18* (2006.01)
*F02M 25/07* (2006.01)
*F02B 37/007* (2006.01)

(52) U.S. Cl.
CPC ............... *F02B 37/18* (2013.01); *F02B 37/007* (2013.01); *F02M 25/0713* (2013.01)

(58) Field of Classification Search
CPC ...... F02B 37/004; F02B 37/18; F02B 37/103; F02D 17/02; F02D 9/00; F02D 17/00; F02M 25/07; Y02T 10/144
USPC ............. 60/612, 602, 605.1, 611, 605.2, 599; 123/562, 198 F, 568.11, 568.12, 564, 123/563
See application file for complete search history.

(56) References Cited

U.S. PATENT DOCUMENTS

| | | | |
|---|---|---|---|
| 6,715,289 B2 | 4/2004 | Mader et al. | |
| 6,786,190 B2 | 9/2004 | Wu et al. | |
| 2006/0021347 A1* | 2/2006 | Sun et al. | 60/612 |
| 2007/0056282 A1* | 3/2007 | Iwaszkiewicz | 60/602 |
| 2010/0024416 A1* | 2/2010 | Gladden et al. | 60/612 |
| 2012/0260650 A1* | 10/2012 | Luft et al. | 60/605.2 |
| 2012/0285164 A1* | 11/2012 | Kuhlbach et al. | 60/602 |

FOREIGN PATENT DOCUMENTS

| | | | | |
|---|---|---|---|---|
| DE | 3629841 A1 * | 5/1987 | | F02B 37/02 |
| DE | 102008052167 A1 * | 4/2010 | | F02D 23/00 |
| EP | 2246543 A1 * | 11/2010 | | F02B 37/007 |

* cited by examiner

*Primary Examiner* — Thai Ba Trieu
*Assistant Examiner* — Ngoc T Nguyen
(74) *Attorney, Agent, or Firm* — Harness, Dickey & Pierce, P.L.C.

(57) ABSTRACT

An internal combustion engine includes an engine defining a plurality of cylinders including full-time active cylinders and cylinders capable of being deactivated. A turbocharger system having a high pressure turbocharger in communication with the exhaust passages from the full-time active cylinders and a low pressure turbocharger in communication with the exhaust passages from the cylinders capable of being deactivated. A control valve is provided in communication with the exhaust passages from the full-time active cylinders and being operable in an open position to allow exhaust gases from the full-time active cylinders to pass through the second turbocharger along with the exhaust gasses from the cylinders capable of being deactivated, and being operable in a closed position to direct exhaust gases from the full-time active cylinders to pass through the first turbocharger.

5 Claims, 4 Drawing Sheets

US 9,121,338 B1

TWO-STAGE TURBOCHARGER SYSTEM FOR INTERNAL COMBUSTION ENGINES FEATURING CYLINDER DEACTIVATION

FIELD

The present disclosure relates to a two-stage turbocharger system for internal combustion engines featuring cylinder deactivation.

BACKGROUND

This section provides background information related to the present disclosure which is not necessarily prior art.

Present regulatory conditions in the automotive market have led to an increasing demand to improve fuel economy and reduce emissions in present vehicles. These regulatory conditions must be balanced with the demands of a consumer for high-performance and quick response for a vehicle. Cylinder deactivation is a technology that often is applied to naturally aspirated internal combustion engines to improve the engine's efficiencies under part-load conditions by switching off a selected number of cylinders so the remaining cylinders would operate with reduced pumping losses [see "Active Fuel Management Technology: Hardware Development on a 2007 GM 3.9L V-6 OHV SI Engine," SAE Paper 2007-01-1292, 2007.]

Cylinder deactivation can be applied to turbocharged engines as disclosed in U.S. Pat. Nos. 6,715,289 and 6,786,190. However, when an engine is equipped with a single turbocharger, the operating ranges of the engine in the deactivated mode can be limited by the turbocharger compressor's flow and boost pressure capabilities [see "The 1.4-L TSI Gasoline Engine with Cylinder Deactivation," MTZ, volume 73, March 2012.]

It is possible to size a turbocharger compressor to favor the deactivated operation of the engine, primarily at lower engine speeds. This would require the use of a smaller compressor, by compromising the engine's performance at high engine speeds. The compressor can be at a size such that a single fixed geometry turbine is not capable of driving the compressor to meet performance requirements. As anticipated, a smaller turbine is desired to meet the low engine speed target while a larger turbine is desired to meet the high engine speed target.

When packaging and complexity are not of concerns, a two-stage turbocharger system can be adopted with greater flexibilities than what can be achieved with a single turbocharger. With the addition of another turbocharger, the so-called high-pressure turbocharger can be sized for the deactivated operation.

The present disclosure provides an enhanced two-stage turbocharger system that is architected for engines featuring cylinder deactivation and its operating modes.

SUMMARY

This section provides a general summary of the disclosure, and is not a comprehensive disclosure of its full scope or all of its features.

An internal combustion engine includes an engine defining a plurality of cylinders including full-time active cylinders and cylinders capable of being deactivated. A turbocharger system having a high pressure turbocharger in communication with the exhaust passages from the full-time active cylinders and a low pressure turbocharger in communication with the exhaust passages from the cylinders capable of being deactivated. A control valve is provided in communication with the exhaust passages from the full-time active cylinders and being operable in an open position to allow exhaust gases from the full-time active cylinders to pass through the second turbocharger along with the exhaust gasses from the cylinders capable of being deactivated, and being operable in a closed position to direct exhaust gases from the full-time active cylinders to pass through the first turbocharger.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
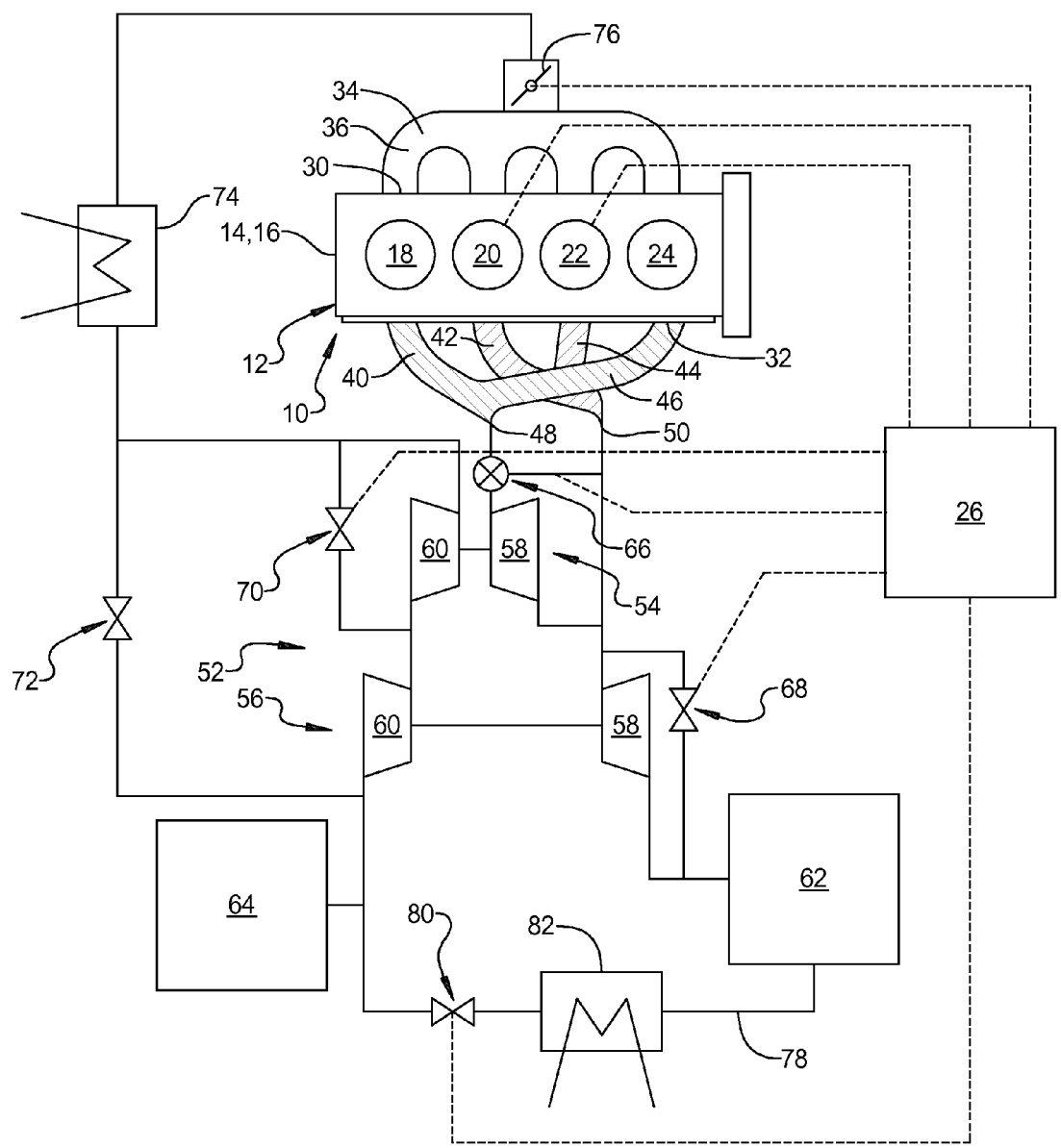
FIG. 1 is a schematic view of an engine featuring cylinder deactivation and a two-stage turbocharger system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

An engine assembly 10 is illustrated in FIG. 1 and includes an engine structure 12. The engine structure 12 may include an engine block 14 and a cylinder head 16. The engine structure 12 may define first, second, third and fourth cylinders 18, 20, 22, 24. The description includes first, second, third and fourth cylinders 18, 20, 22, 24 for simplicity and it is understood that the present teachings apply to any number of piston-cylinder arrangements and a variety of reciprocating engine configurations including, but not limited to, V-engines, in-line engines, and horizontally opposed engines, as well as both overhead cam and cam-in-block configurations. The engine structure supports a crankshaft and a plurality of pistons that are disposed in the respective cylinders 18, 20, 22, 24 as is known in the art.

The engine 10 features cylinder deactivation such that, by way of example, a controller 26 can deactivate one or more of the cylinders 18, 20, 22, 24. In the example shown, cylinders 20 and 22 can be deactivated by the controller 26. The cylinder deactivation occurs as a function of load or torque demand by the vehicle as determined by variables such as manifold pressure. If the internal combustion engine is in a condition where it can deliver the desired torque with partial displacement to improve efficiency, the controller 26 will deactivate the mechanisms operating the valves for the selected cylinders and also shut off fuel and spark to the selected cylinders. The deactivated cylinders will then function as air springs.

Figure 4:
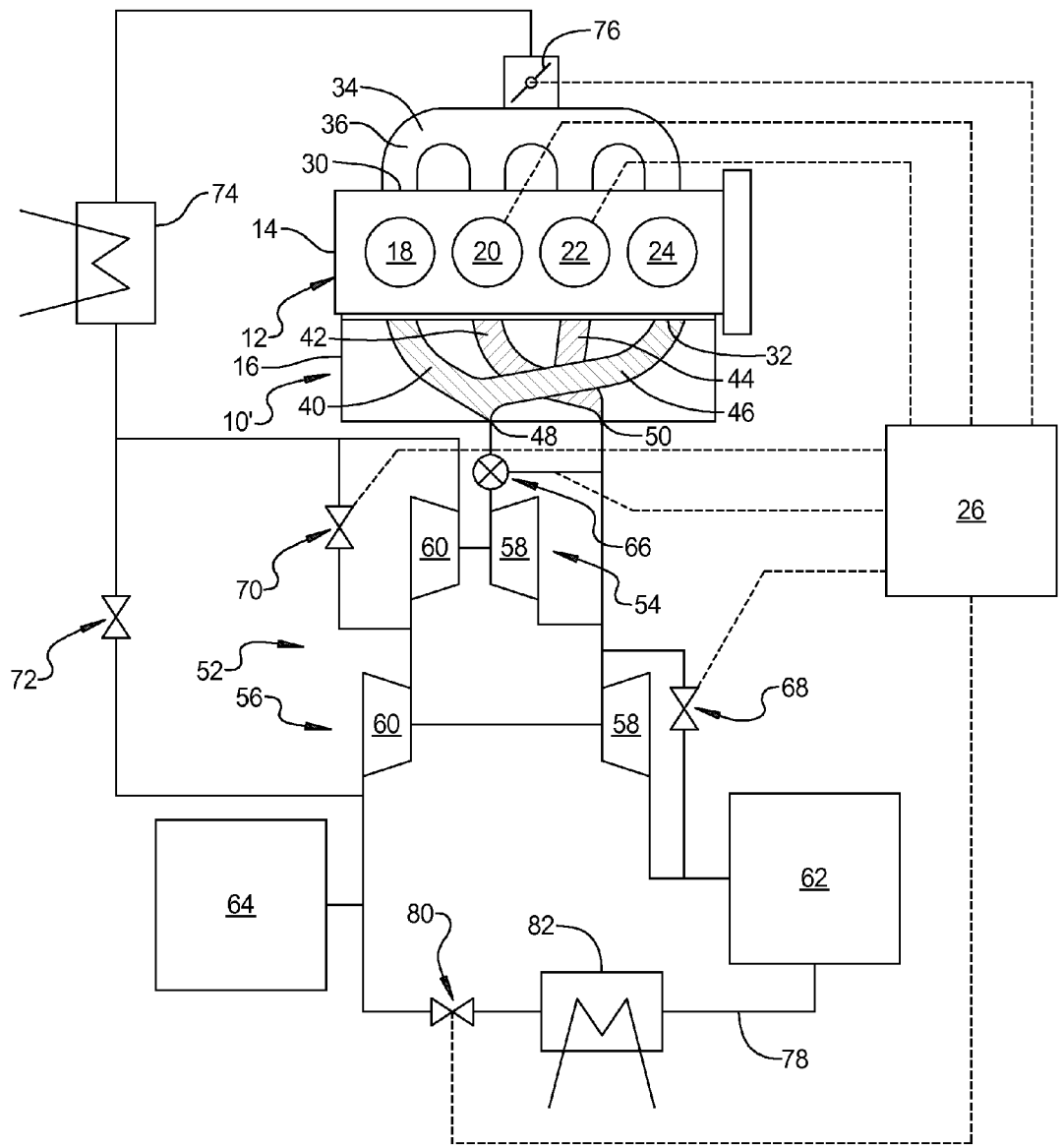
FIG. 4 is a schematic view of an engine featuring cylinder deactivation and a two-stage turbocharger system according to the principles of the present disclosure with the exhaust manifold being an integral part of the cylinder head.

The engine structure 12 may define a plurality of intake ports 30 (only one is labeled) and a plurality of exhaust ports 32 (only one is labeled) in the cylinder head 16 associated with each of the cylinders 18, 20, 22 and 24. Engine assembly 10 includes an intake manifold 34 having a plurality of runners 36 (only one is labeled) in communication with each of the intake ports 30. A plurality of exhaust runners 40, 42, 44, 46 are in communication with each of the exhaust ports 32. The exhaust runners are bifurcated so that the exhaust runners 40 and 46 from the full-time active cylinders 18, 24 are connected to each other at first exhaust passage 48 and the exhaust runners 42 and 44, from the cylinders 20, 22 that can be deactivated, are connected to each other at second exhaust passage 50. For other engine architectures like inline-6, V6, V8, etc., appropriate deactivated cylinders can be chosen based on the same firing order considerations. For each of these engine configurations, appropriate exhaust manifold(s) can be constructed to achieve the same method of cylinder grouping. FIG. 4 illustrates an alternative engine assembly 10' similar to the system of engine assembly 10, with the exhaust manifold including exhaust runners 40, 42, 44, and 46 as well as the first and second exhaust passages 48, 50 integrated into the cylinder head 16.

A two-stage turbocharger system 52 includes a first turbocharger 54 and a second turbocharger 56. The first turbocharger 54 receives exhaust gases from the first exhaust passage 48 and the second turbocharger 56 receives exhaust gasses from the second exhaust passage 50. Each of the first and second turbochargers 54, 56 include a turbine 58 that is connected to a shaft that drives a compressor 60. The turbines 58 of the first and second turbochargers 54, 56 are driven by the exhaust gasses from the first and second exhaust passages 48, 50. The exhaust gasses that pass through the turbines 58 are exhausted through the exhaust system 62. The compressors 60 are in communication with an intake system 64 and provide compressed air to the intake manifold 34. A control valve 66 is controlled by the controller 26 for selectively directing exhaust gases from the first exhaust passage 48 to the second exhaust passage so that all of the exhaust gasses are directed to the turbine 58 of the second turbocharger 56. A wastegate 68 is controlled by the controller for allowing exhaust gasses from the turbine 58 of the first turbocharger 54 to bypass the second turbocharger 56 and go directly to the exhaust system 62. A bypass valve 70 is controlled by the controller 26 for allowing compressed intake air from the compressor 60 of the second turbocharger 56 to bypass the first turbocharger for delivery to the intake manifold 34. A purge valve 72 is in communication with the intake system 64. The intake air from the turbochargers 54, 56 passes through a heat exchanger 74 to cool the intake air prior to passing through a throttle valve 76 that is controlled by the controller 26. The engine assembly 10 can be provided with a low-pressure exhaust gas recirculation (EGR) passage 78 that is controlled by an EGR control valve 80 to direct exhaust gases from the exhaust system to be mixed with the intake air from the intake system 64. The EGR passage 78 can be provided with a heat exchanger 82 to cool the recirculated exhaust gases prior to introduction into the intake system 64.

Figure 2:
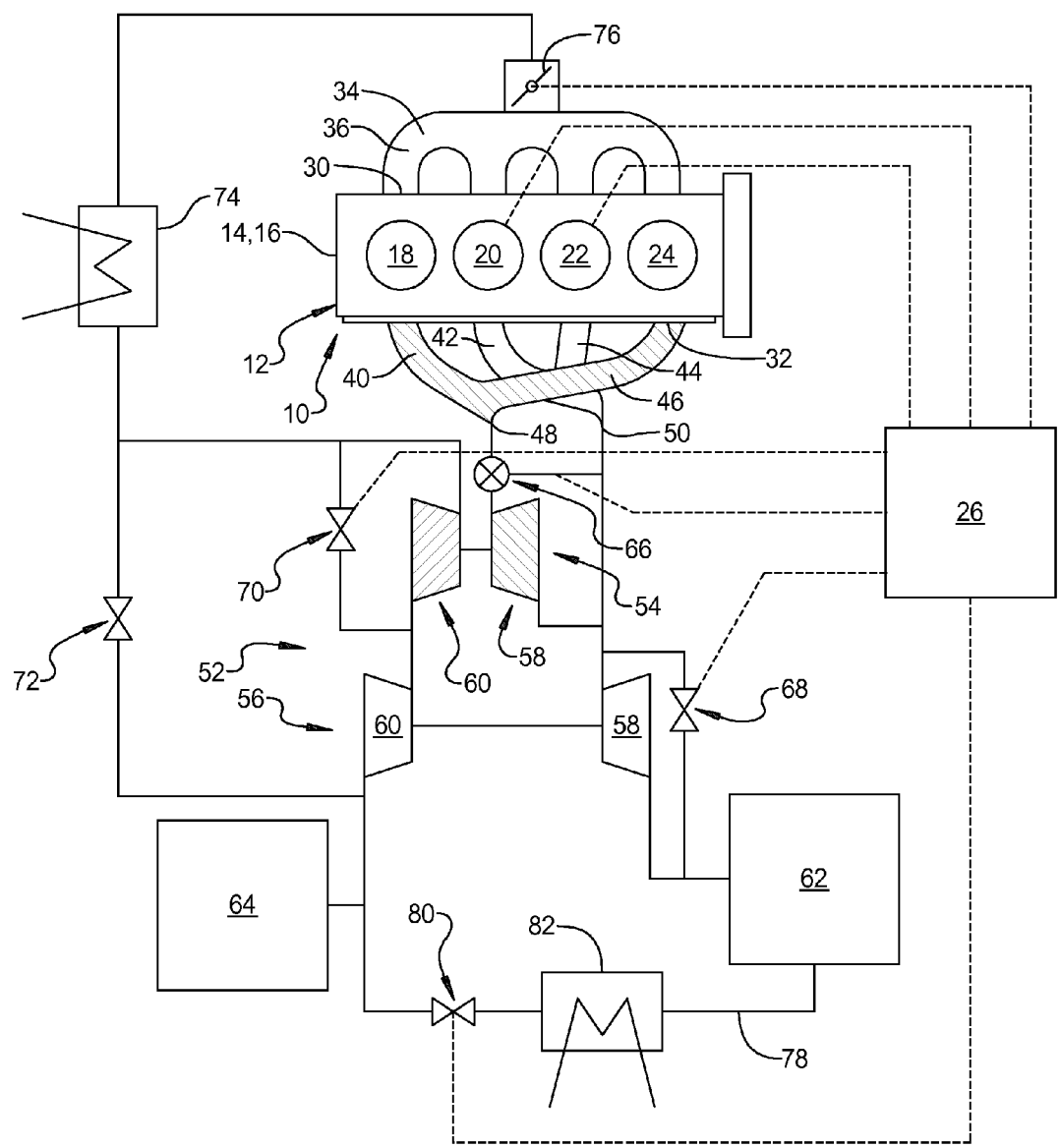
FIG. 2 is a schematic view of the engine featuring cylinder deactivation and a two-stage turbocharger system as shown in FIG. 1 with cylinders deactivated for operation at a predetermined low speed and under a predetermined low load and the high pressure turbocharger being operated.

The operation of the engine 10 under predetermined low load and predetermined low speed conditions when the cylinders 20 and 22 are deactivated by the controller 26 is illustrated in FIG. 2. In this mode of operation, the turbine control valve 66, high-pressure compressor bypass 70 and purge valve 72 are closed while the wastegate 68 is preferably open to minimize the exhaust backpressure. The exhaust flow from the cylinders 18 and 24 can be fully utilized to power the turbine of the first (high pressure) turbocharger 54, which in turn drives the compressor 60 of the first turbocharger to generate the desired boost.

Figure 3:
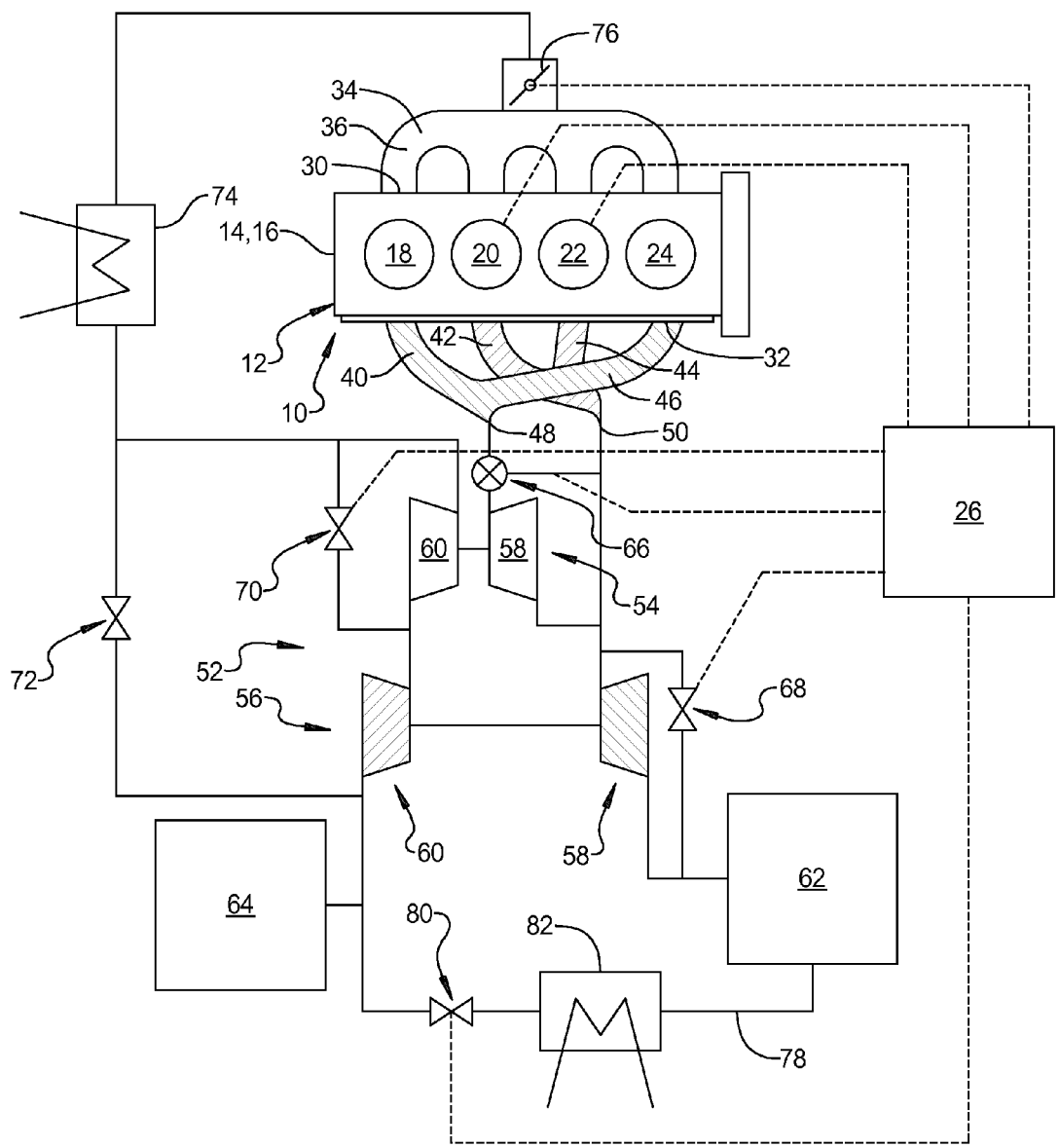
FIG. 3 is a schematic view of the engine featuring cylinder deactivation and a two-stage turbocharger system as shown in FIG. 1 with all cylinders operable and the exhaust routed to a low pressure turbocharger.

FIG. 3 illustrates the other engine operating mode when all the cylinders are active. In this mode of operation, the turbine control valve 66 is open to allow the exhaust flow from the cylinders 18 and 24 to merge with the exhaust flow from the cylinders 20 and 22 before entering the low-pressure turbine 58 of the second (low pressure) turbocharger 56. Similar to the conventional practice, the wastegate 68 can be modulated to allow the turbine 58 to drive the compressor 60 of the low pressure turbocharger to generate desired boost. The high-pressure compressor bypass 70 is open to allow the air flow from the compressor of the low pressure turbocharger 56 to reach the intake manifold 34 of the engine 10.

The engine 10 of the present disclosure is intended to achieve the desired functionalities with minimum complexities, i.e., by having a single turbine control valve 66. It is conceivable that optional control valves can be added to fully isolate the two turbines.

The EGR system 78 has been demonstrated to help alleviate combustion limitations under high-load conditions such as pre-ignition and knock for gasoline engines and NOx and smoke emissions for diesel engines. Since the engine in the deactivated mode would operate more frequently in higher specific load range in a vehicle relative to the full-engine mode, by having a dedicated high-pressure turbocharger allows the greatest flow and boost capabilities for EGR flows in addition to air.

The controller 26 coordinates the operation of the turbochargers' bypass valves and engine deactivation along with any necessary sensors. In addition, the controller controls the throttle body 76, which regulates the engine's load, by regulating the inlet flow rates. The controller also controls the EGR valve, if equipped.

With the high-pressure turbocharger 54 of a two-stage system dedicated for engine operation with a selected number of its cylinders deactivated, the turbocharger 54 can be sized to generate desired boost to extend the engine's operating range in the deactivated mode at higher available efficiencies, even with EGR, and thus enhancing the engine's efficiency characteristics.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A turbocharged internal combustion engine, comprising
an engine structure including a block defining a plurality of cylinders and a cylinder head mounted to the block, the cylinder head defining inlet ports and outlet ports in communication with each of said plurality of cylinders, at least one of the cylinders being deactivated at low engine load operations;
an intake manifold in communication with each of the inlet ports;
a bifurcated exhaust system including a first exhaust passage connected to at least one of the outlet ports of at least one of the plurality of cylinders and a second exhaust passage connected to at least one of the outlet ports of the at least one of the cylinders to be deactivated;
a first turbocharger having a first turbine in communication with the first exhaust passage and a first compressor in communication with the intake manifold;
a second turbocharger having a second turbine in communication with the second exhaust passage and a second compressor in communication with the intake manifold;
a control valve in connection between the first exhaust passage and the second exhaust passage and controllable to an open state to allow the exhaust gasses to pass from the first exhaust passage to the second exhaust passage; and
a controller operable to control the control valve and to activate and deactivate the at least one of the cylinders to be deactivated, wherein during operation of the engine with all of the plurality of cylinders activated, the controller opens the control valve to connect the first exhaust passage to the second exhaust passage so that all of the exhaust gasses are directed to the second turbine of the second turbocharger.

2. The turbocharged internal combustion engine according to claim 1, further comprising a throttle body disposed upstream of the intake manifold, wherein said controller controls operation of the throttle body.

3. The turbocharged internal combustion engine according to claim 1, wherein an outlet of the first turbine of the first turbocharger is connected to an inlet of the second turbine of the second turbocharger.

4. A turbocharged internal combustion engine, comprising
an engine structure including a block defining a plurality of cylinders and a cylinder head mounted to the block, the cylinder head defining inlet ports and outlet ports in communication with each of said plurality of cylinders, at least one of the cylinders being deactivated at low engine load operations;
an intake manifold in communication with each of the inlet ports;
a bifurcated exhaust system including a first exhaust passage connected to at least one of the outlet ports of at least one of the plurality of cylinders and a second exhaust passage connected to at least one of the outlet ports of the at least one of the cylinders to be deactivated;
a first turbocharger having a first turbine in communication with the first exhaust passage and a first compressor in communication with the intake manifold;
a second turbocharger having a second turbine in communication with the second exhaust passage and a second compressor in communication with the intake manifold;
a control valve in connection between the first exhaust passage and the second exhaust passage and controllable to an open state to allow the exhaust gasses to pass from the first exhaust passage to the second exhaust passage; and
a controller operable to control the control valve and to activate and deactivate the at least one of the cylinders to be deactivated, wherein during operation of the engine below a predetermined low speed and below a predetermined low load, the controller deactivates the at least one of the cylinders to be deactivated and closes the control valve to isolate the first exhaust passage from the second exhaust passage.

5. The turbocharged internal combustion engine according to claim 4, wherein an outlet of the first turbine of the first turbocharger is connected to an inlet of the second turbine of the second turbocharger.

* * * * *